(12) United States Patent
Lesser et al.

(10) Patent No.: US 6,467,650 B1
(45) Date of Patent: Oct. 22, 2002

(54) ARRANGEMENT OF FASTENING ELEMENTS FOR HOLDING BUNDLES RETAINED BY CABLE TIES

(75) Inventors: Hans-Jurgen Lesser, Rheinfelden; Martin Busch, Efringen-Kirchen; Hartmut Jackle, Laufenburg-Luttingen, all of (DE)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/720,110

(22) PCT Filed: Jun. 16, 1999

(86) PCT No.: PCT/EP99/04145
§ 371 (c)(1),
(2), (4) Date: Dec. 18, 2000

(87) PCT Pub. No.: WO99/67859
PCT Pub. Date: Dec. 29, 1999

(30) Foreign Application Priority Data

Jun. 24, 1998 (DE) .......................................... 198 28 007

(51) Int. Cl.[7] .............................................. B23Q 7/04
(52) U.S. Cl. ...................................................... 221/208
(58) Field of Search ........................... 221/1, 208, 277, 221/258, 268; 24/16 PB, 16 R, 17 R, 30.5 P

(56) References Cited

U.S. PATENT DOCUMENTS 4,640,320 A * 2/1987 Avison et al. ............ 140/93 A

* cited by examiner

Primary Examiner—Kenneth W. Noland
(74) Attorney, Agent, or Firm—Gifford, Krass, Groh, Sprinkle, Anderson & Citkowski, P.C.

(57) ABSTRACT

The present invention provides an arrangement of fastening elements for holding bundles retained by cable ties, and a method therefor. The arrangement of elements includes a pair of strips removably attached to a sequence of fastening elements, whereby the pair of strips facilitate the transport, readying, and positioning of each fastening element prior to interaction with the cable tie. Also provided is a method for molding the arrangement of cable ties in which the cable ties are advantageously used for retaining bundles of cables, pipes, and similarly elongated items.

14 Claims, 3 Drawing Sheets

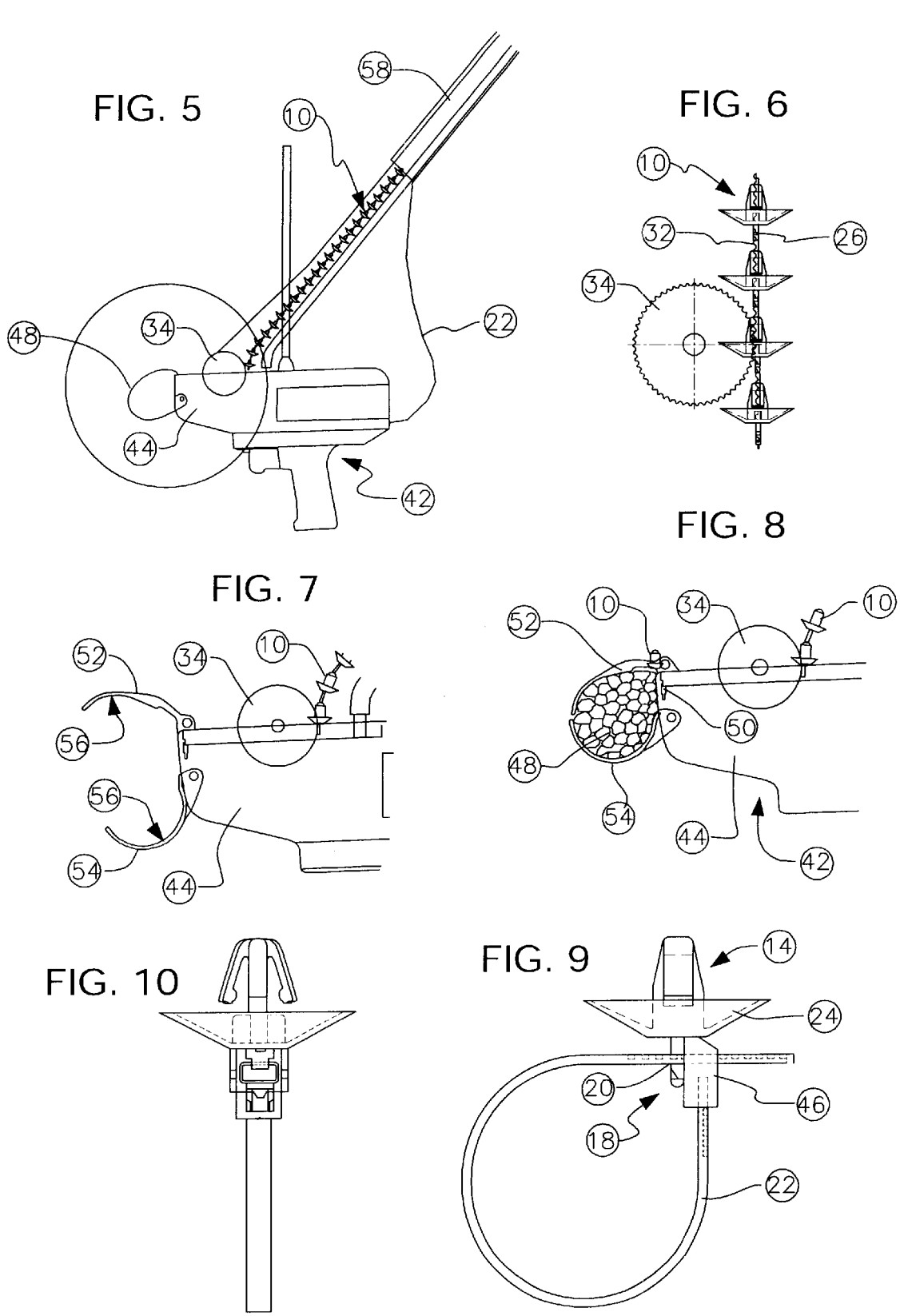

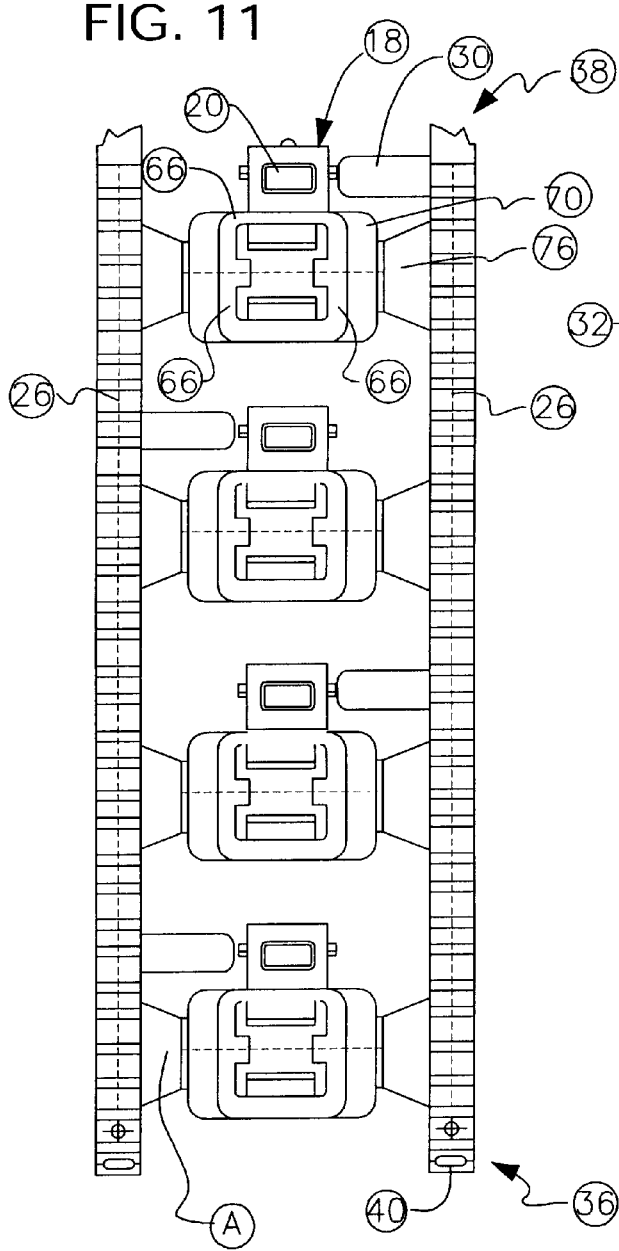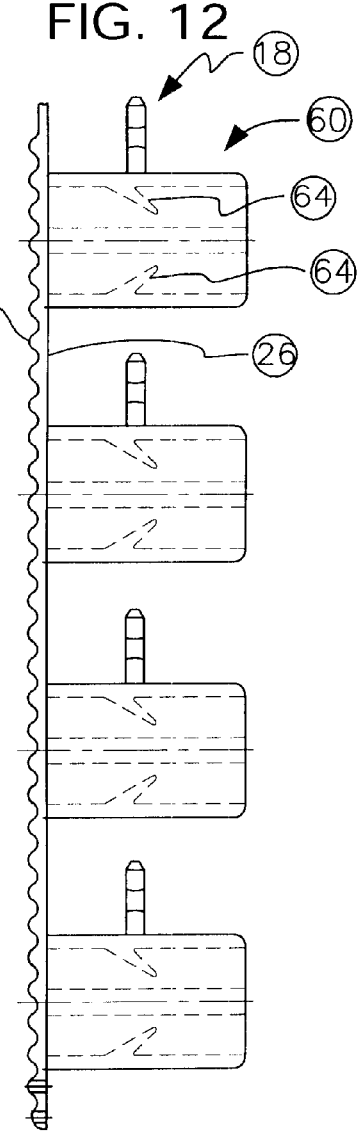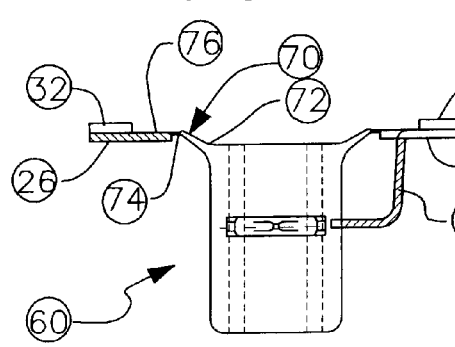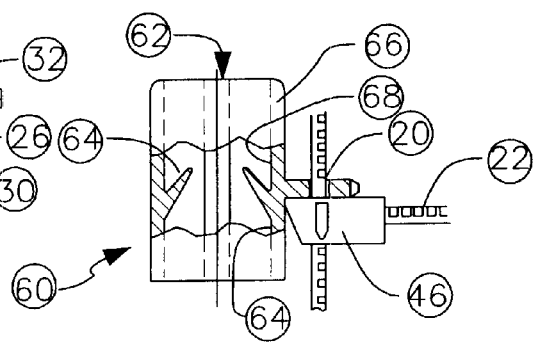

ARRANGEMENT OF FASTENING ELEMENTS FOR HOLDING BUNDLES RETAINED BY CABLE TIES

This application is a 371 of PCT/EP99/04145 filed on Jun. 16, 1999.

FIELD OF THE INVENTION

The invention pertains to an arrangement of fastening elements for holding bundles retained by cable ties, as well as a process for arranging fastening elements in a row, in which the cable ties are advantageously used for retaining bundles of cables, pipes and similarly elongated items. The locking components for the cable ties can be joined in one piece with their leader or designed as separate pieces which—as in the case of the binding device according to EPS 0 565 968—are connected to the ends drawn from a roll of continuous cable tie.

BACKGROUND OF THE INVENTION

Following the assembly of the cables and the insertion and cinching of the cable tie in the locking component, a separate plastic fastening element should be used for retaining the bundle, as disclosed in DE 94 01 448 U1. For the positive threading of the cable tie, this fastening element has a holding loop with its fastening plate anchored on an appropriately formed support part. Here it has been shown to be advantageous when the threading of the cable tie into the holding loop and the positioning of the tie in the holding loop are manually accomplished by means of a pin. This operation, however, is not only time-consuming (and therefore costly), but also requires dexterity.

The use of binding devices for processing continuous sequences of cable ties via automatic feed prior to interaction with locking components results in difficulties threading the cable tie through the holding loop of the fastening element, both before and after the assembly of the bundle of cables. Also, costly vibrator conveyors with appropriate guide channels are needed for the exact positioning element and the guiding in front of the tie exit opening of the binding device.

Accordingly, it is the objective of the invention to economically design and coordinate the fastening elements so that a supply of the fastening elements can be transported and positioned correctly for efficient processing in the binding device.

SUMMARY OF THE INVENTION

The present invention overcomes the issues of the prior and current art, and meets the aforementioned objectives with the design of the fastening elements and their pull-off union with strips. The pair of strips serves as the transport strips in the automatic operation. It is then possible for the fastening elements to be supplied to the binding device as a group in a position favoring further processing and, following their separation from the strips, to be favorably positioned for threading the cable tie.

In order to create better preconditions for the automatic processing of the fastening elements in the binding device, additional means such as a rack profile on one surface of each strip enhance the transport of the strips or make it possible for several groups of fastening elements arranged in rows to be combined in a chain of any desired length when injected in the casting mold and then subsequently rolled up, so that a great supply of fastening elements is available.

The foregoing examples represent several of the embodiments of the present invention; however, one skilled in the art will recognize that the examples in no way limit the invention disclosed herein.

Described in DE 41 05 460 C2 is a process for arranging cable binders in a so-called tie cluster for use in a binding device, in which the individual ties are end-bonded by injection. Here the bundling ties aligned one after the other in the longitudinal direction are connected by fusing their ends together in the molding tool, to then be separated again from each succeeding tie after being used in the binding device.

On the other hand, the ties fused together at their ends serve merely as transport adjuncts in the feed and automatic positioning of fastening elements arranged in a row and are not utilized in the binding of the cable bundles.

BRIEF DESCRIPTION OF THE DRAWINGS

FIG. 5 illustrates a binding device having guide hasps for cable ties and automatic positioning of fastening elements arranged in a row;

FIG. 6 illustrates a gearwheel drive for strips having a rack profile;

FIG. 7 illustrates an enlarged front of the binding device with open guide hasps;

FIG. 8 illustrates the enlarged front of the binding device with closed guide hasps and an inserted bundle of cable, as well as a fastening element positioned beside the locking component;

FIG. 9 illustrates a side view of a closed cable tie with a fastening element positioned in the tie loop;

FIG. 10 illustrates a frontal view of the cable tie with the fastening element;

FIG. 11 illustrates a top view of another embodiment according to the present invention with an arrangement of fastening elements for securing threaded bolts, the fastening elements held together only by means of a pair of strips;

FIG. 12 illustrates a side view of the arrangement of fastening elements depicted in FIG. 11;

FIG. 13 illustrates a cross section of the pair of strips and the support flaps shown along line A in FIG. 11, and FIG. 14 illustrates a side view of the closed cable tie with a fastening element inside the tie loop.

DETAILED DESCRIPTION OF THE INVENTION

In accordance with the present invention, there is provided a preferred embodiment of an arrangement of fastening elements for holding bundles retained by cable ties, as well as a process for arranging fastening elements in a row, in which the cable ties are advantageously used for retaining bundles of cables, pipes, and similar elongated items.

Figure 1:
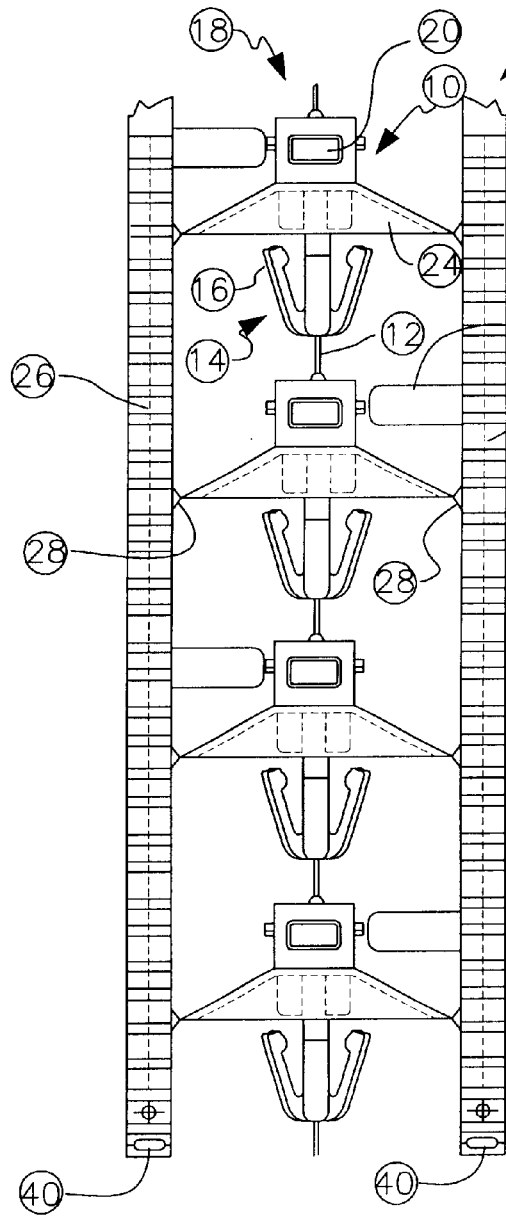
FIG. 1 illustrates a top view of an arrangement of fastening elements according to the present invention, joined together by means of connectors and strips.
Figure 2:
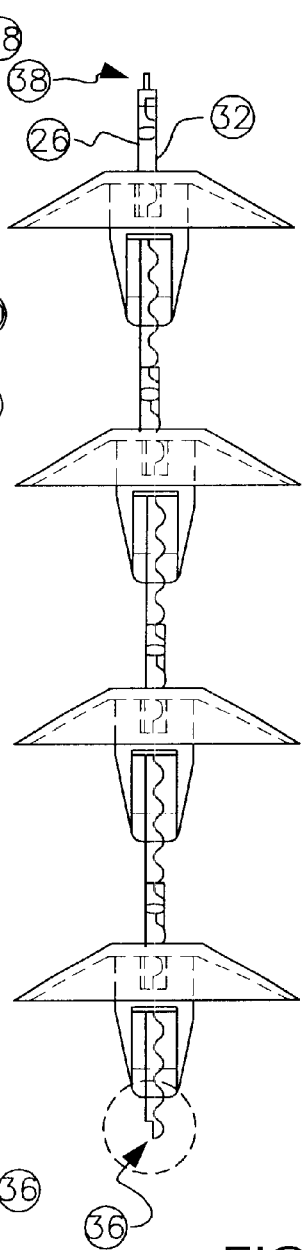
FIG. 2 illustrates a side view of the arrangements of fastening elements depicted in FIG. 1.
Figure 3:
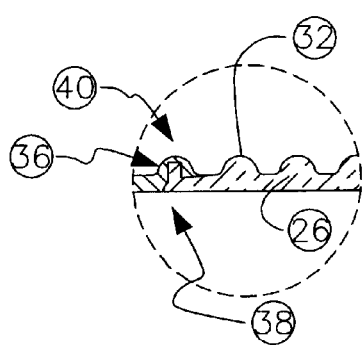
FIG. 3 illustrates a side view of a single fastening element with partial cross section view shown through the head and the collar.

Referring now to the drawings wherein like numbers are used to denote like items throughout, FIGS. 1 and 2 show a plurality of fastening elements 10, which are arranged one after the other in a row and are joined together by a plurality of connectors 12. Each connector 12 in the plurality of connectors 12 removably detaches from its associated fastening elements 10. Each fastening element 10 includes a mounting portion 14, which is equipped with a pair of resilient legs 16 for anchoring in the hole of a fastening plate (not shown). Each fastening element 10 further includes a head 18 forming an aperture 20 therethrough; e.g., a cross-sectionally rectangular holding loop for the positive threading of a cable tie 22, shown hereinafter in FIG. 5. Between the head 18 and the mounting portion 14, there is a collar 24, which provides for flexible positioning of the fastening element 10 on an supporting plate (not shown).

On both sides of the collar 24 are molded a pair of strips 26, the strips 26 formed during the injection molding, while the molding material is directed into the collar 24 via a pair of links 28. Additional links 30 are provided between the pair of strips 26 and the heads 18 of the fastening elements 10 in order to ensure a rapid filling of the mold in the area of the head 18.

The pair of strips 26 running past the collar 24 on both sides provide the great advantage that, once the two halves of the casting mold have been removed, the pair of strips 26 remain connected to the collar 24 by the pair of links 28 in such a way that the pair of strips 26 can be used as transport strips in the ensuing readying of the fastening elements 10.

Figure 4:
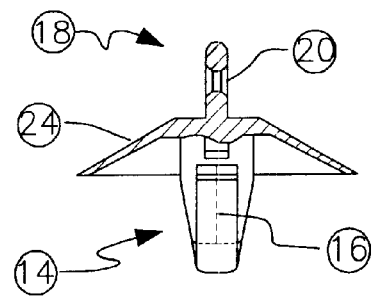
FIG. 4 illustrates conjoined, stepwise offset ends of two successive strips.

To this end, each strip 26 of the pair of strips 26 is provided with a rack profile 32 on one side, which can be driven by a comparably designed cogwheel 34 shown together with a binding device 42 in FIGS. 5–8. Furthermore, the pair of strips 26, as can be seen in FIG. 4, are stepwise offset at both ends, so that an offset end having a step 36 on the one end of the strip 26 fits together with an opposing end having opposing step 38, on the leading end of the following strip 26 to form a full cross-sectional strip. In order to connect together the strips 26 of a finished arrangement of fastening elements 10 with the leading portion of the strip 26 of the following arrangement of fastening elements 10, the leading end of each strip 26 is provided with a recess 40 therein, in the area of the offset end having the step 36, which, in the production of the fastening element 10 groups according to the invention, serves as the receiver of the injection material of the succeeding strip 26.

Once the mold has been opened, the finished injection-molded fastening elements 10, together with their pair of strips 26, are lifted out of the casting mold. Then the pair of strips 26 with their recessed ends are positioned in a comparably formed casting mold so that, when the next fastening element 10 group is injection molded, the molding material for the pair of strips 26 penetrates into the recess 40 in the ends of the preceding pair of strips 26 remaining in the mold and fills them in such a way that both ends of both pairs of strips 26 remain immovably conjoined. In this manner, it is possible to injection mold as many connected groups of fastening elements 10 as desired, and to wind them into a roll for subsequent readying in the binding device 42, shown in FIG. 5.

As illustrated in FIGS. 5–9, the binding device 42 represents in its basic configuration ordinary binding devices with continuous feed of cable ties 22 of predetermined length, which are fed through a locking component 46; prepositioned in the front 44 of the binding device 42; passed around the cable bundle 48; reinserted into the locking component 46; tightened; and separated behind the locking component 46 by means of a cutter 50.

Turning now to FIG. 7, there are shown two approximately semicircular guide hasps 52 and 54 respectively, for encircling the cable tie 22. The guide hasps 52 and 54 are pivotably mounted on the front 44 of the binding device 22. These are first shown in the open position in FIG. 7. After receiving the cable bundle 48 to be retained, the guide hasps 52 and 54 are pivoted together to provide on the inside a guide groove 56 for the introduced cable tie 22, by means of which the cable tie 22 is securely guided into the opening of the locking component 46 and there engaged in a known manner. Also located above the binding device 42 is a guide channel 58 (shown in FIG. 5), for the fastening elements 10 held together by connectors 12 and the pair of strips 26. Pivotably mounted on the lower end of the guide channel 58 is also a cogwheel 54, which engages in the rack profile 32 of the pair of strips 26, so that in each instance a fastening element 10 having a head 18 and an aperture 20 is initially drawn down (cf. FIG. 7).

For threading the cable ties 22 into the aperture 20 of the head 18, the fastening element 10 must be advanced by an displacement device (not shown), to a position in front of the exit opening of the front 44, and readied with the head 18 in front of the laterally advanced locking component 46. Then the cable tie 22 can be pushed through the locking component 46 and the head 18, through the guide groove 56 of the two guide hasps 52 and 54, and again into the locking component 46, where it is then engaged in a known manner (cf. FIGS. 9 and 10).

Depicted in FIGS. 11–14 is another embodiment of the present invention, in which the fastening elements 60 are designed for holding threaded bolts. The fastening elements 10 are held together only by the pair of strips 26. The fastening element 60 consists of a sleeve 62 having a pair of fingers 64, an outer wall 66, and an inner wall 68. The pair of fingers 64 are formed on the inner wall 68, and directed obliquely toward the middle, for engaging in the grooves of a threaded bolt (not shown). The sleeve 62 also includes a head 18 formed on the outer wall 66, and having an aperture 20 therethrough. The aperture 20 functions to facilitate the insertion of the cable tie 22 therethrough.

On the outer walls 66 offset thereto by 90°, laterally obliquely projecting support flaps 70 are formed, which provide a cushioned resting of the fastening elements 60 on the support part (not shown). The free edges of these support flaps 70 are connected by a pair of detachable flaps 76 to the pair of strips 26, which are provided with a rack profile 32 in the same manner as depicted in FIGS. 1, 2 and 4. Furthermore—exactly as in the preferred embodiment depicted in FIGS. 1 and 2—additional links 30 are provided between the pair of strips 26 and the heads 18 of the fastening elements 60, so as to ensure a rapid filling of the mold in the area of the head 18.

The description of the foregoing embodiments should be understood as encompassing only examples, and not restricted to the readying of fastening elements with heads for threading cable ties for holding cable bundles. Rather, the invention is applicable for all fastening elements that are to be readied for any automatically controlled mounting operations using strips as transport adjuncts for proper positioning.

We claim:

1. An arrangement of fastening elements for fastening cable ties, the arrangement of fastening elements comprising:
    a pair of parallel strips; and
    a plurality of fastening elements, each fastening element in the plurality of fastening elements having a body with a head forming an aperture therethrough, the plurality of fastening elements removably attached to and disposed between the pair of parallel strips.

2. The arrangement of fastening elements according to claim 1, wherein each fastening element in the plurality of fastening elements further comprises a pair of links, each link of the pair of links extending from a respective one of the strips of the pair of parallel strips.

3. The arrangement of fastening elements according to claim 1, further comprising a plurality of additional links, each additional link in the plurality of additional links extending from one of the strips of the pair of parallel strips and removably attached to the head of one fastening element in the plurality of fastening elements.

4. The arrangement of fastening elements according to claim 1, wherein the body of each fastening element in the plurality of fastening elements further comprises a collar, the collar removably attached to the pair of links in one respective fastening element in the plurality of fastening elements.

5. The arrangement of fastening elements according to claim 4, wherein each fastening element in the plurality of fastening elements further comprises a mounting portion, the mounting portion extending from the body of one respective fastening element in the plurality of fastening elements.

6. The arrangement of fastening elements according to claim 5, wherein each fastening element in the plurality of fastening elements further comprises a pair of resilient legs, the pair of resilient legs obliquely extending from the mounting portion of one respective fastening element in the plurality of fastening elements.

7. The arrangement of fastening elements according to claim 5, wherein each fastening element in the plurality of fastening elements further comprises a connector, the connector removably attached to the mounting portion of one respective fastening element in the plurality of fastening elements and removably attached to the head of an adjacent fastening element in the plurality of fastening elements.

8. The arrangement of fastening elements according to claim 1, wherein the body of each fastening element in the plurality of fastening elements further comprises a sleeve having an inner wall and an outer wall.

9. The arrangement of fastening elements according to claim 8, wherein each fastening element in the plurality of fastening elements further comprises a pair of opposing fingers, each opposing finger in the pair of opposing fingers having one end formed on the inner wall of the sleeve of one respective fastening element in the plurality of fastening elements and an opposite end obliquely directed toward the longitudinal axis of the sleeve of one respective fastening element in the plurality of fastening elements.

10. The arrangement of fastening elements according to claim 8, wherein each fastener in the arrangement of fasteners further comprises:

a pair of support flaps, each support flap in the pair of support flaps having one side formed on the outer wall of the sleeve of one respective fastening element in the plurality of fastening elements and an opposite side obliquely projected from the outer wall of the sleeve of one respective fastening element in the plurality of fastening elements; and a pair of detachable flaps, each detachable flap in the pair of detachable flaps removably attached to the opposite side of one respective support flap in the pair of support flaps and removably attached to one respective strip in the pair of parallel strips.

11. The arrangement of fastening elements according to claim 1, wherein each strips in the pair of parallel strips further comprises one surface having a rack profile thereon.

12. The arrangement of fastening elements according to claim 11, wherein each strip in the pair of parallel strips further comprises an offset end and an opposing offset end, whereby each offset end of each strip in a pair of strips joins with the opposing offset end of one respective strip of adjacent pairs of parallel strips to form a continuous pair of parallel strips.

13. The arrangement of fastening elements according to claim 12, wherein each offset end in each strip in the pair of parallel strips further comprises a step and each opposing offset end in each strip in the pair of parallel strips further comprises an opposing step whereby the pair of parallel strips joins with adjacent pairs of parallel strips to form a pair of continuous parallel strips, each strip in the continuous pair of parallel strips having a uniform cross section.

14. The arrangement of fastening elements according to claim 13, wherein each step of each offset end in each strip in the pair of parallel strips further comprises a step having a recess therein, whereby each recess of each step of each offset end in each strip in the pair of parallel strips accommodates at least a portion of one respective opposing step of one opposing offset end of one strip in adjacent parallel pairs of strips.

\* \* \* \* \*